United States Patent
Fukuda (10) Patent No.: US 11,358,873 B2
(45) Date of Patent: Jun. 14, 2022

(54) METHOD FOR PRODUCING STABLE ISOTOPE LABELED CARBON MONOXIDE AND METHOD FOR PRODUCING STABLE ISOTOPE LABELED CARBON DIOXIDE

(71) Applicant: TAIYO NIPPON SANSO CORPORATION, Tokyo (JP)

(72) Inventor: Kenji Fukuda, Tsukuba (JP)

(73) Assignee: TAIYO NIPPON SANSO CORPORATION, Tokyo (JP)

(*) Notice: Subject to any disclaimer, the term of this patent is extended or adjusted under 35 U.S.C. 154(b) by 558 days.

(21) Appl. No.: 16/261,790

(22) Filed: Jan. 30, 2019

(65) Prior Publication Data
US 2019/0241438 A1    Aug. 8, 2019

(30) Foreign Application Priority Data
Feb. 7, 2018 (JP) .............................. JP2018-020361

(51) Int. Cl.
| C01B 32/50 | (2017.01) |
| C01B 3/16 | (2006.01) |
| C01B 32/40 | (2017.01) |

(52) U.S. Cl.
CPC ............... *C01B 32/50* (2017.08); *C01B 3/16* (2013.01); *C01B 32/40* (2017.08); *C01B 2203/0283* (2013.01); *C01B 2203/1276* (2013.01)

(58) Field of Classification Search
CPC .................................................... C01B 32/50
See application file for complete search history.

(56) References Cited

U.S. PATENT DOCUMENTS

| 6,321,565 | B1* | 11/2001 | Kihara | ................... | B01D 59/04 |
| | | | | | 62/643 |
| 6,461,583 | B1* | 10/2002 | Hayashida | ............. | B01D 59/04 |
| | | | | | 202/158 |
| 2009/0158663 | A1* | 6/2009 | Deluga | .................. | C10K 3/003 |
| | | | | | 48/209 |

FOREIGN PATENT DOCUMENTS

| CN | 105126835 | 12/2015 |
| JP | 3-060722 | 3/1991 |
| JP | 2010-58043 | 3/2010 |

OTHER PUBLICATIONS

Andreev, "Separation of Isotopes of Biogenic Elements in Two-phase Systems", First Edition, ISBN:9780444529817, Elsevier, Science, Dec. 28, 2006, pp. 217-245.
(Continued)

*Primary Examiner* — Paul A Wartalowicz
(74) *Attorney, Agent, or Firm* — Nixon & Vanderhye P.C.

(57) ABSTRACT

One object of the present invention is to provide a method for producing stable isotope labeled carbon monoxide capable of controlling the abundance ratio of a specific kind of the stable oxygen isotope to be an arbitrary value, the present invention provides a method for producing stable isotope labeled carbon monoxide including: a first mixing step in which carbon monoxide selectively containing at least one kind of stable isotope selected from the group consisting of $^{12}C^{16}O$, $^{12}C^{17}O$, $^{12}C^{18}O$, $^{13}C^{16}O$, $^{13}C^{17}O$, and $^{13}C^{18}O$, and water vapor selectively containing at least one kind of stable isotope selected form the group consisting of $H_2^{16}O$, $H_2^{17}O$ and $H_2^{18}O$ are mixed to produce stable isotope labeled carbon dioxide: and a second mixing step in which the stable isotope labeled carbon dioxide produced in the first mixing step and hydrogen are mixed.

18 Claims, 2 Drawing Sheets

(56) References Cited

OTHER PUBLICATIONS

Office Action issued in JP Appln. No. 2018-020361 dated Apr. 6, 2021 (w/ translation).

* cited by examiner

METHOD FOR PRODUCING STABLE ISOTOPE LABELED CARBON MONOXIDE AND METHOD FOR PRODUCING STABLE ISOTOPE LABELED CARBON DIOXIDE

FIELD OF THE INVENTION

The present invention relates to a method for producing stable isotope labeled carbon monoxide and a method for producing stable isotope labeled carbon dioxide.

Priority is claimed on Japanese Patent Application No. 2018-020361, filed Feb. 7, 2018, the content of which is incorporated herein by reference.

DESCRIPTION OF RELATED ART

Since stable isotope labeled carbon monoxides are rich in reactivity, stable isotope labeled carbon monoxides are useful as a labeling substance and the like in industrial fields such as natural science and medicine, and industrially widely manufactured. As the stable isotope labeled carbon monoxide, there are mainly six stable isotope of $^{12}C^{16}O$, $^{12}C^{17}O$, $^{12}C^{18}O$, $^{13}C^{16}O$, $^{13}C^{17}O$, and $^{13}C^{18}O$.

As a method for concentrating a specific kind of the stable isotope labeled carbon monoxide from carbon monoxide containing a plurality of kinds of stable isotopes, a cryogenic separation method has been known. According to the cryogenic separation method, the stable isotope labeled carbon monoxide ($^{13}CO$) having $^{13}C$ is concentrated to raise the abundance ratio of $^{13}C$ and the concentration of $^{13}CO$ in carbon monoxide can be increased to, for example, 95 atom % or more.

A concentration method combining the cryogenic separation method and an isotope exchange reaction has also been known (by B. Andreev, "Separation of Isotope of Biogenic Elements in Two-phase Systems", First edition, ISBN: 9780444529817, Elsevier Science, Dec. 28, 2006, pp 217-245.

According to the method described in "Separation of Isotope of Biogenic Elements in Two-phase Systems", for example, $^{12}C^{18}O$ is first concentrated by the cryogenic separation method, and a part of the $^{12}C^{18}O$ concentrated is converted to $^{13}C^{18}O$ by the isotope exchange reaction represented by the following formula (1). Next, the $^{13}C^{18}O$ converted is concentrated again to concentrate $^{13}CO$ to 98 to 99 atom %, and thereby the abundance ratio of $^{13}C$ is further increased.

$$^{12}C^{18}O + {}^{13}C^{16}O \rightarrow {}^{13}C^{18}O + {}^{12}C^{16}O \qquad \text{Formula (1)}$$

On the other hand, according to the cryogenic separation method, it is possible to concentrate a specific kind of the stable isotope labeled carbon monoxide while freely controlling the concentration of $^{13}CO$ in carbon monoxide to be less than 95 atom %.

Table 1 shows an example of the abundance ratio of each stable isotope labeled carbon monoxide concentrated by the cryogenic separation method. As shown in Table 1, according to the cryogenic separation method, $^{13}C^{16}O$ of which the natural abundance ratio is 1.1 atom % can be concentrated to about 92.4 atom %.

Thus, in the prior art, it was possible to concentrate a specific kind of the stable isotope labeled carbon monoxide while freely controlling the abundance ratio of $^{13}C$ to be an arbitrary value.

TABLE 1

| Stable isotope | Molecular weight (u) | Natural abundance ratio [atom %] | Abundance ratio [atom %] after cryogenic separation |
|---|---|---|---|
| $^{12}C^{16}O$ | 28 | 98.7 | 0.14 |
| $^{13}C^{16}O$ | 29 | 1.1 | 92.4 |
| $^{12}C^{18}O$ | 30 | 0.2 | 2.1 |
| $^{13}C^{18}O$ | 31 | 0.0022 | 5.36 |

SUMMARY OF THE INVENTION

Technical Problem

However, no investigation has been made on the abundance ratio of the stable oxygen isotope in the conventional method described in "Separation of Isotope of Biogenic Elements in Two-phase Systems". Therefore, in the conventional method, the abundance ratio of the stable oxygen isotope has been left to the conclusion of concentrating $^{13}CO$. That is, it is difficult to control the abundance ratio of a specific kind of the stable oxygen isotope to be an arbitrary value by the conventional method described in "Separation of Isotope of Biogenic Elements in Two-phase Systems".

When the inventor of the present invention concentrated $^{13}CO$ by the conventional method, the abundance ratio of $^{18}O$ in the concentrated $^{13}CO$ was about 8 to 17 atom %. Thereby, it was found that $^{13}CO$, which was concentrated by the conventional method, may be difficult to apply for industrial applications as they are.

For example, $^{13}CO$, which mainly contains about 15 atom % of $^{13}C^{18}O$ and about 85 atom % of $^{13}C^{16}O$, may not be applicable to industrial or medical application requiring a higher concentration of $^{13}C^{16}O$. In this case, a further process is needed to reduce the abundance ratio of $^{13}C^{18}O$ to less than 1 atom %.

On the other hand, since the abundance ratio of $^{18}O$ in $^{13}CO$ concentrated by the conventional method is about 8 to 17 atom %, in order to be used to applications requiring a high concentration of $^{13}C^{18}O$, there are cases in which further processes are required to increase the abundance ratio of $^{13}C^{18}O$ to 98 atom % or more.

The present invention has been made in view of the above circumstances, and an object of the present invention is to provide a method for producing stable isotope labeled carbon monoxide capable of controlling the abundance ratio of a specific kind of the stable oxygen isotope to be an arbitrary value, and a method for producing stable isotope labeled carbon dioxide capable of controlling the abundance ratio of a specific kind of the stable oxygen isotope to be an arbitrary value.

Solution to Problem

In order to solve the above problem, the present invention has the following methods.

[1] A method for producing stable isotope labeled carbon monoxide including:

a first mixing step in which carbon monoxide selectively containing at least one kind of stable isotope selected from the group consisting of $^{12}C^{16}O$, $^{12}C^{17}O$, $^{12}C^{18}O$, $^{13}C^{16}O$, $^{13}C^{17}O$, and $^{13}C^{18}O$, and water vapor selectively containing at least one kind of stable isotope selected form the group consisting of $H_2^{16}O$, $H_2^{17}O$ and $H_2^{18}O$ are mixed to produce stable isotope labeled carbon dioxide: and a second mixing step in which the stable isotope labeled carbon dioxide produced in the first mixing step and hydrogen are mixed.

[2] The method for producing stable isotope labeled carbon monoxide according to [1], wherein, in the first mixing step, a volume ratio (V1/V2) between a flow rate V1 of the water vapor and a flow rate V2 of the carbon monoxide is set to 1 to 100.

[3] The method for producing stable isotope labeled carbon monoxide according to [1] or [2], wherein, in the second mixing step, a volume ratio (V3/V4) between a flow rate V3 of the hydrogen and a flow rate V4 of the stable isotope labeled carbon dioxide is set to 1 to 20.

[4] The method for producing stable isotope labeled carbon monoxide according to any one of [1] to [3], wherein, before the first mixing step, an abundance ratio of stable carbon isotope in the carbon monoxide is controlled to be an arbitrary value in advance.

[5] The method for producing stable isotope labeled carbon monoxide according to any one of [1] to [4], wherein, before the first mixing step, an abundance ratio of stable oxygen isotope in the water vapor is controlled to be an arbitrary value in advance.

[6] The method for producing stable isotope labeled carbon monoxide according to any one of [1] to [5], wherein, after the second mixing step, an abundance ratio of stable carbon isotope is controlled to be an arbitrary value.

[7] The method for producing stable isotope labeled carbon monoxide according to any one of [1] to [6], wherein the second step is performed a plurality of times.

[8] The method for producing stable isotope labeled carbon monoxide according to any one of [1] to [7], wherein the water vapor contains 95 atom % or more of $H_2^{18}O$ with respect to a total of 100 atom % of $H_2^{16}O$, $H_2^{17}O$, and $H_2^{18}O$.

[9] The method for producing stable isotope labeled carbon monoxide according to any one of [1] to [7], wherein the at least one kind of stable oxygen isotope in the stable isotope selectively contained in the carbon monoxide and a kind of stable oxygen isotope in the stable isotope selectively contained in the water vapor are different from each other.

[10] The method for producing stable isotope labeled carbon monoxide according to [9], wherein the water vapor selectively contains one or both of $H_2^{16}O$ and $H_2^{17}O$.

[11] A method for producing stable isotope labeled carbon dioxide including:
a mixing step in which carbon monoxide selectively containing at least one kind of stable isotope selected from the group consisting of $^{12}C^{16}O$, $^{12}C^{17}O$, $^{12}C^{18}O$, $^{13}C^{16}O$, $^{13}C^{17}O$, and $^{13}C^{18}O$ and water vapor selectively containing at least one kind of stable isotope selected from the group consisting of $H_2^{16}O$, $H_2^{17}O$, and $H_2^{18}O$ are mixed.

Advantageous Effects of Invention

According to the present invention, it is possible to control the abundance ratio of the specific stable oxygen isotope in the stable isotope labeled carbon monoxide or the stable isotope labeled carbon dioxide to be an arbitrary value.

DESCRIPTION OF EMBODIMENTS

In the present description, "selectively containing stable isotope" means containing a specific kind of stable isotope more than the natural abundance ratio.

Hereinafter, a method for producing stable isotope labeled carbon monoxide and a method for producing stable isotope labeled carbon dioxide according to one embodiment of the present invention will be described in detail with reference to the drawings. In order to make the features easier to understand, there are cases where the characteristic portion is enlarged for the sake of convenience, and the dimensional ratio and so on of each component is not necessarily the same as the actual.

First Embodiment

Figure 1:
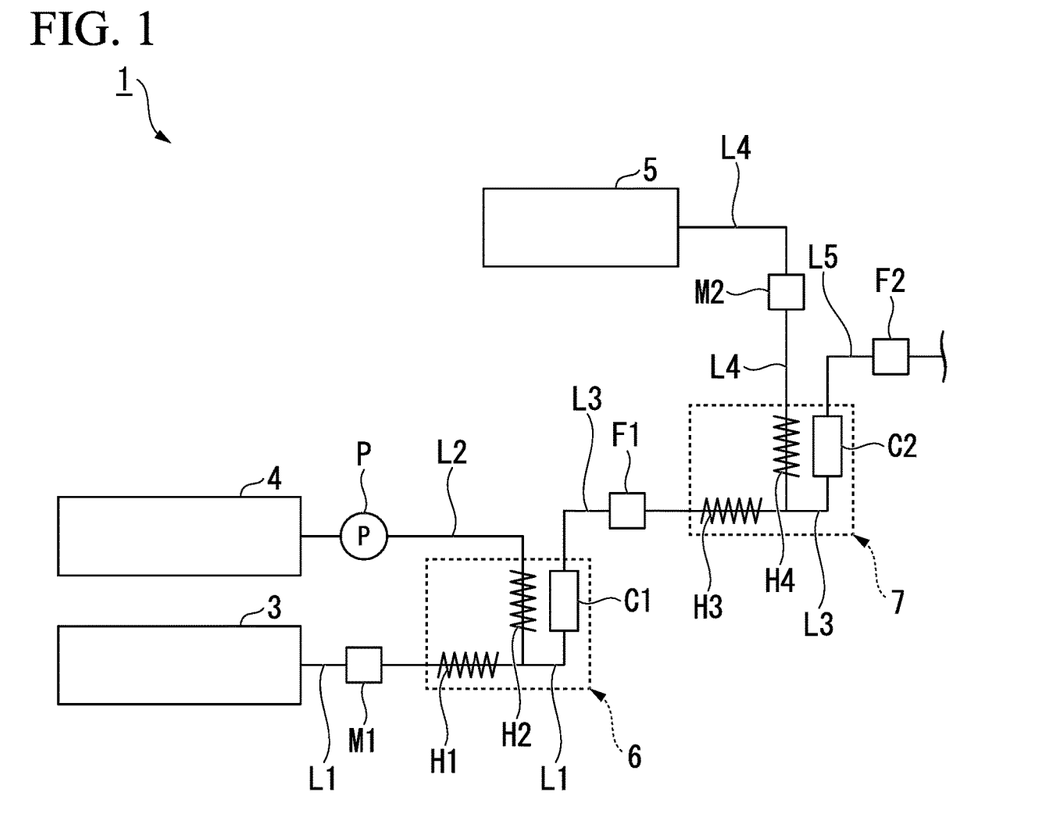
FIG. 1 is a schematic diagram showing an example of a producing apparatus applicable to a method for producing stable isotope labeled carbon monoxide according to a first embodiment.

FIG. 1 is a schematic diagram showing an example of a producing apparatus 1 applicable to a method for producing stable isotope labeled carbon monoxide according to first embodiment. In other words, the producing apparatus 1 is an apparatus in which the abundance ratio of a specific kind of stable isotope in carbon monoxide containing a plurality of kinds of stable isotopes is controlled. As shown in FIG. 1, the producing apparatus 1 includes supply sources 3, 4, and 5, supply lines L1, L2, and L4, a connection line L3, a lead-out line L5, catalyst tubes C1 and C2, temperature control device 6 and 7, and dehumidifiers F1 and F2.

The supply line L1 has a first end connected to the supply source 3, and a second end connected to the primary side (upstream side) of the catalytic tube C1. The supply line L1 is provided with a flow regulator M1 and a heat exchanger H1 in this order from the primary side.

The supply line L2 has a first end connected to the supply source 4, and a second end connected to a supply line L1 between the heat exchanger H1 and the catalytic tube C1. The supply line L2 is provided with a pump P and a heat exchanger H2 in this order from the primary side.

The connection line L3 has a first end connected to the secondary side (downstream side) of the catalytic tube C1 and a second end connected to the primary side of the catalytic tube C2. Thereby, the connection line L3 connects between the secondary side of the catalyst tube C1 and the primary side of the catalytic tube C2. The connection line L3 is provided with the dehumidifier F1 and a heat exchanger H3 in this order from the primary side.

The supply line L4 has a first end connected to the supply source 5 and a second end connected to the connection line L3 between the heat exchanger H3 and the catalytic tube C2. The supply line L4 is provided with a flow regulator M2 and a heat exchanger H4 in this order from the primary side.

The lead-out line L5 has a first end connected to the secondary side of the catalyst tube C2, and a second end (not shown) connected to a storage container (not shown). The lead-out line L5 is provided with the dehumidifier F2. In addition, the lead-out line L5 is provided with an analyzer (not shown) at the secondary side of the dehumidifier F2. As the analyzer (not shown), FT-IR, gas chromatography and the like are exemplary examples; however, the analyzer is not limited to these examples.

A catalyst provided in the catalyst tubes C1 and C2 is not particularly limited. Examples of the catalyst provided in the catalyst tubes C1 and C2 include Cu/Zn/Al$_2$O$_3$ based catalysts, Cu/Cr/Fe based catalysts, Cu/Zn/Al/Mg based catalysts, Fe/Cr/Cu/C based catalysts, and Ni/Al based catalysts.

The temperature control device 6 is not particularly limited as long as it can control the temperature of the heat exchangers H1 and H2 and the catalyst tube C1. Similarly, the temperature control device 7 is not particularly limited as long as it can control the temperature of the heat exchangers H3 and H4 and the catalyst tube C2.

The supply source 3 is a supply source of carbon monoxide. The supply source 3 supplies carbon monoxide into the catalyst tube C1 via the supply line L1. The carbon monoxide selectively contains at least one kind of stable isotope selected from the group consisting of $^{12}C^{16}O$, $^{12}C^{17}O$, $^{12}C^{18}O$, $^{13}C^{16}O$, $^{13}C^{17}O$, and $^{13}C^{18}O$. The carbon monoxide may contain a plurality of kinds of stable isotopes. In the present description, "a plurality of kinds of stable isotope labeled carbon monoxides" means at least two kinds of stable isotopes selected from the group consisting of $^{12}C^{16}O$, $^{12}C^{17}O$, $^{12}C^{18}O$, $^{13}C^{16}O$, $^{13}C^{17}O$, and $^{13}C^{18}O$.

The amount of the specific stable isotope selectively contained in the carbon monoxide is preferably 30 atom % or more, more preferably 50 atom % or more, still more preferably 90 atom % or more, and particularly preferably 95 atom % or more with respect to the total of 100 atom % of all kinds of stable isotopes contained in the carbon monoxide. When the amount of the stable isotope selectively contained in the carbon monoxide is within this range, the abundance ratio of the specific stable carbon isotope and the specific stable oxygen isotope in the stable isotope labeled carbon monoxide produced by the method of the present embodiment can be easily controlled to be an arbitrary value.

In the present description, the specific stable carbon isotope is either one or both of $^{12}C$ and $^{13}C$, and the specific stable oxygen isotope is at least one kind selected from the group consisting of $^{16}O$, $^{17}O$ and $^{18}O$.

It is preferable that the abundance ratio of $^{12}C$ or $^{13}C$ in the stable isotope selectively contained in the carbon monoxide be controlled to be an arbitrary value in advance. Thereby, the abundance ratio of the specific stable oxygen isotope in the stable isotope labeled carbon monoxide obtained by the method of this embodiment can be easily controlled to be an arbitrary value. At the same time, the abundance ratio of the specific stable carbon isotope in the stable isotope labeled carbon monoxide can also be easily controlled to be an arbitrary value.

Further, it is preferable that the specific stable isotope selectively contained in the carbon monoxide include either $^{12}C$ or $^{13}C$. When the specific stable isotope selectively contained in the carbon monoxide includes either one of $^{12}C$ or $^{13}C$, the abundance ratio of the specific stable oxygen isotope in the stable isotope labeled carbon monoxide produced by the method of this embodiment can be easily controlled to be an arbitrary value. At the same time, the abundance ratio of the specific stable carbon isotope in the stable isotope labeled carbon monoxide produced by the method of this embodiment can also be easily controlled to be an arbitrary value.

The carbon monoxide may be prepared by concentrating a specific kind of stable isotope by the cryogenic separation method. In addition, the carbon monoxide selectively containing specific stable isotope may be prepared by combining the cryogenic separation method and the isotope exchange reaction. For example, the abundance ratio of the stable carbon isotope in the carbon monoxide can be controlled to be an arbitrary value in advance by the cryogenic separation method or the combination of the cryogenic separation method and the isotope exchange reaction.

The supply source 4 is a supply source of water. The water supplied from the supply source 4 is heated by the heat exchanger 2 to produce water vapor. The water vapor produced is supplied into the catalyst tube C1 via the supply line L2 and a part of the supply line L1. The water vapor selectively contains at least one kind of stable isotope selected from the group consisting of $H_2^{16}O$, $H_2^{17}O$, and $H_2^{18}O$.

The amount of the specific stable isotope selectively contained in the water vapor is preferably 30 atom % or more, more preferably 50 atom % or more, still more preferably 90 atom % or more, and particularly preferably 95 atom % or more with respect to the total of 100 atom % of all kinds of stable isotopes contained in the water vapor. When the amount of the specific stable isotope selectively contained in the water vapor is within this range, the abundance ratio of the specific stable oxygen isotope in the stable isotope labeled carbon monoxide obtained by the method of this embodiment can be easily controlled to be an arbitrary value.

In the present embodiment, it is preferable that the water vapor selectively contain one kind of $H_2^{16}O$, $H_2^{17}O$, and $H_2^{18}O$ as the specific stable isotope. When water vapor selectively contains one kind of stable isotope of $H_2^{16}O$, $H_2^{17}O$, and $H_2^{18}O$ as the specific stable isotope, it is possible to control the abundance ratio of the specific oxygen stable isotope in the stable isotope labeled carbon monoxide obtained by the method of this embodiment to a high arbitrary value, that is, concentrate the specific oxygen stable isotope in the stable isotope labeled carbon monoxide.

For example, when the water vapor selectively contains selectively only $H_2^{18}O$ as the specific stable isotope, the abundance ratio of $^{18}O$ in the obtained stable isotope labeled carbon monoxide can be concentrated to be an arbitrary value.

The supply source 5 is a supply source of hydrogen. The supply source 5 supplies hydrogen into the catalyst tube C2 via the supply line L4 and a part of the connection line L3.

In the producing apparatus 1 having the above-described configuration, the carbon monoxide and the water vapor can be mixed in the catalyst tube C1 to produce a reaction product containing stable isotope labeled carbon dioxide. The stable isotope labeled carbon dioxide which can be produced in the catalyst tube C1 selectively contains at least one kind of stable isotope labeled carbon dioxide selected from the group consisting of $^{12}C^{16}O^{16}O$, $^{12}C^{17}O^{17}O$, $^{12}C^{18}O^{18}O$, $^{12}C^{16}O^{17}O$, $^{12}C^{17}O^{18}O$, $^{12}C^{18}O^{16}O$, $^{13}C^{16}O^{16}O$, $^{13}C^{17}O^{17}O$, $^{13}C^{18}O^{18}O$, $^{13}C^{16}O^{17}O$, $^{13}C^{17}O^{18}O$, and $^{13}C^{18}O^{16}O$.

Moreover, the stable isotope labeled carbon dioxide may contain a plurality of kinds of carbon dioxides stable isotopes. Examples of the plurality of kinds of carbon dioxides include at least two selected from the group consisting of $^{12}C^{16}O^{16}O$, $^{12}C^{17}O^{17}O$, $^{12}C^{18}O^{18}O$, $^{12}C^{16}O^{17}O$, $^{12}C^{17}O^{18}O$, $^{12}C^{18}O^{16}O$, $^{13}C^{16}O^{16}O$, $^{13}C^{17}O^{17}O$, $^{13}C^{18}O^{18}O$, $^{13}C^{16}O^{17}O$, $^{13}C^{17}O^{18}O$, and $^{13}C^{18}O^{16}O$.

The amount of the specific kind of stable isotope labeled carbon dioxide selectively contained in the stable isotope labeled carbon dioxide is preferably 30 atom % or more, more preferably 50 atom % or more, still more preferably 90 atom % or more, and particularly preferably 95 atom % or more with respect to the total of 100 atom % of all kinds of stable isotope labeled carbon dioxides. When the amount of the specific kind of stable isotope labeled carbon dioxide selectively contained in the stable isotope labeled carbon dioxide is within this range, the abundance ratio of the specific stable carbon isotope and the abundance ratio of the specific stable oxygen isotope in the stable isotope labeled carbon monoxide produced by the apparatus 1 can be easily controlled to arbitrary values.

In the apparatus 1, it is preferable to select the stable isotope labeled carbon monoxide and the water vapor such that the stable isotope labeled carbon dioxide contains at least one kind selected from the group consisting of $^{12}C^{16}O^{16}O$, $^{12}C^{17}O^{17}O$, $^{12}C^{18}O^{18}O$, $^{13}C^{16}O^{16}O$, $^{13}C^{17}O^{17}O$, and $^{13}C^{18}O^{18}O$ as the specific stable isotope labeled carbon dioxide. In apparatus 1, it is more preferable to select the stable isotope labeled carbon monoxide and the water vapor such that the stable isotope labeled carbon dioxide contains at least one kind selected from the group consisting of $^{12}C^{17}O^{17}O$, $^{12}C^{18}O^{18}O$, $^{13}C^{16}O^{16}O$, $^{13}C^{17}O^{17}O$, and $^{13}C^{18}O^{18}O$ as the specific stable isotope labeled carbon dioxide. When the stable isotope labeled carbon dioxide selectively contains at least one kind selected from the group consisting of $^{12}C^{16}O^{16}O$, $^{12}C^{17}O^{17}O$, $^{12}C^{18}O^{18}O$, $^{13}C^{16}O^{16}O$, $^{13}C^{17}O^{17}O$, and $^{13}C^{18}O^{18}O$ as the specific stable isotope labeled carbon dioxide, the abundance ratio of the specific stable oxygen isotope in the stable isotope labeled carbon monoxide produced by the method of the present embodiment can be easily controlled to be an arbitrary value.

As a method for producing the stable isotope labeled carbon dioxide selectively containing at least one kind selected from the group consisting of $^{12}C^{16}O^{16}O$, $^{12}C^{17}O^{17}O$, $^{12}C^{18}O^{18}O$, $^{13}C^{16}O^{16}O$, $^{13}C^{17}O^{17}O$, and $^{13}C^{18}O^{18}O$ as the specific stable isotope labeled carbon dioxide, a method for producing stable isotope labeled carbon dioxide according to the present embodiment which is explained below can be used, but the method is not limited thereto.

(Method for Producing Stable Isotope Labeled Carbon Monoxide)

Next, a method for producing stable isotope labeled carbon monoxide of the first embodiment will be described with reference to FIG. 1. In order to simplify the explanation, in the following first embodiment, a case, in which the carbon monoxide selectively contains only $^{13}C^{16}O$ as the specific stable isotope, and the water vapor selectively contains only $H_2^{18}O$ as the specific stable isotope, will be described as one embodiment.

First, carbon monoxide and water vapor are mixed in the method for producing stable isotope labeled carbon monoxide according to the first embodiment. Specifically, carbon monoxide is supplied from the supply source 3 into the catalyst tube C1, water is supplied from the supply source 4 into the catalyst tube C1, and the carbon monoxide and the water are mixed in the catalyst tube C1. At this time, the carbon monoxide flowing through the supply line L1 is regulated in flow rate by the flow regulator M1. After the carbon monoxide is heated by the heat exchanger H1, the carbon monoxide heated is supplied into the catalyst tube C1. In addition, the water flowing through the supply line L2 is regulated in pressure by the pump P, heated and vaporized by the heat exchanger H2, and then supplied into the catalyst tube C1.

The equilibrium reaction shown in the following equation (2) occurs by mixing the carbon monoxide and the water vapor in the catalyst tube C1. When the equilibrium reaction shown in the following equation (2) occurs, the oxygen atom ($^{18}O$ in the present embodiment) in the specific stable isotope selectively contained in the water vapor is introduced into the stable isotope ($^{13}C^{16}O$ in the present embodiment) selectively contained in the carbon monoxide, and $^{13}C^{16}O^{18}O$ is produced in the present embodiment.

$$^{13}C^{16}O+H_2^{18}O \Leftrightarrow {}^{13}C^{18}O^{16}O+H_2 \qquad \text{Formula (2)}$$

In the equilibrium state shown in the formula (2), an isotope exchange reaction shown in the following formula (3) occurs by excessively supplying the water vapor ($H_2^{18}O$ in the present embodiment). When the reaction shown in in the following formula (3) occurs, the oxygen atom in $^{13}C^{18}O^{16}O$ is exchanged with $^{18}O$ contained in an excessive amount of the water vapor to produce $^{13}C^{18}O^{18}O$.

$$^{13}C^{18}O^{16}O+H_2^{18}O \rightarrow {}^{13}C^{18}O^{18}O+H_2^{16}O \qquad \text{Formula (3)}$$

Next, the stable isotope labeled carbon dioxide selectively containing $^{13}C^{18}O^{18}O$ is mixed with hydrogen.

Specifically, the reaction product of the formula (3) from the catalyst tube C1 is introduced into the connection line L3, moisture contained in the reaction product is removed by the dehumidifier F1, heated by the heat exchanger H3, and then supplied into the catalyst tube C2 as the stable isotope labeled carbon dioxide selectively containing $^{13}C^{18}O^{18}O$. On the other hand, the hydrogen flowing through the supply line L4 is regulated in flow rate by the flow regulator M2, heated by the heat exchanger H4, and then supplied into the catalyst tube C2.

In the catalyst tube C2, the chemical reaction shown in the following formula (4) occurs by in particular excessively supplying hydrogen. The temperature at which the chemical reaction shown in the following formula (4) is carried out may be adjusted appropriately according to the kind of the catalyst provided in the catalyst tube C1, and is not particularly limited.

$$^{13}C^{18}O^{18}O+H_2 \rightarrow {}^{13}C^{18}O+H_2^{18}O \qquad \text{Formula (4)}$$

Thereafter, moisture contained the reaction product of the chemical reaction represented by the formula (4) is removed by the dehumidifier F2 and then the reaction product is led into a storage container (not shown) as stable isotope labeled carbon monoxide selectively containing $^{13}C^{18}O$ via the lead-out line L5. At this time, the abundance ratio of the specific stable isotope labeled carbon monoxide ($^{13}C^{18}O$ in this embodiment) may be analyzed by an analyzer (not shown).

As a result of the chemical reaction represented by the formula (4), an oxygen atom is transferred from the specific stable isotope labeled carbon dioxide ($^{13}C^{18}O^{18}O$ in the present embodiment) selectively contained in the stable isotope labeled carbon dioxide to hydrogen. As a result, it is possible to introduce the specific oxygen atom isotope ($^{18}O$ in the present embodiment) to the specific stable isotope ($^{13}C^{16}O$ in the present embodiment). By such a chemical reaction, it is possible to easily and effectively change the abundance ratio of the oxygen atom isotope in carbon monoxide, and selectively produce the specific stable isotope labeled carbon monoxide.

When mixing the carbon monoxide and the water vapor, the volume ratio (V1/V2) between the flow rate V1 of the water vapor and the flow rate V2 of the carbon monoxide is preferably 1 to 100. However, the volume ratio (V1/V2) can be appropriately adjusted according to the abundance ratio of the stable carbon isotope of the stable oxygen isotope in the specific stable isotope selectively contained in carbon monoxide.

In particular, as described in the present embodiment, when controlling the abundance ratio of the stable oxygen isotope in the carbon monoxide selectively containing $^{13}C^{16}O$, the volume ratio (V1/V2) is preferably from 1 to 10, and more preferably from 5 to 10. When the volume ratio (V1/V2) is equal to or more than the lower limit value, the chemical reaction between the carbon monoxide and the water vapor is easily proceeded. When the volume ratio (V1/V2) is equal to or less than the upper limit value, it is advantageous from the viewpoint of cost.

The temperature at which the carbon monoxide and the water vapor are mixed is not particularly limited, and the temperature may be, for example, 100 to 700° C. The temperature may be appropriately adjusted according to the catalyst provided in the catalyst tube C1.

When mixing the stable isotope labeled carbon dioxide and hydrogen, the volume ratio (V3/V4) between the flow rate V3 of the hydrogen and the flow rate V4 of the stable isotope labeled carbon dioxide is preferably 1 to 20, and more preferably 5 to 20. When the volume ratio (V3/V4) is equal to or more than the lower limit value, the chemical reaction between the stable isotope labeled carbon dioxide and the hydrogen is easily proceeded. When the volume ratio (V3/V4) is equal to or less than the upper limit value, it is advantageous from the cost aspect.

The temperature at which the stable isotope labeled carbon dioxide and the hydrogen are mixed is not particularly limited, and the temperature may be, for example, 600 to 800° C. The temperature may be appropriately adjusted according to the catalyst provided in the catalyst tube C2.

In the present embodiment, it is preferable to perform at least one of the following operations A1 to A3.

Operation A1: Before mixing the carbon monoxide and the water vapor, an operation for controlling the abundance ratio of the stable carbon isotope in the carbon monoxide to be an arbitrary value in advance.

Operation A2: Before mixing the carbon monoxide and the water vapor, an operation for controlling the abundance ratio of the stable oxygen isotope in the water vapor to be an arbitrary value in advance Operation A3: After mixing the stable isotope labeled carbon dioxide and the hydrogen, an operation for controlling the abundance ratio of the stable carbon isotope in the stable isotope labeled carbon monoxide to be an arbitrary value.

When at least one of the operations A1 to A3 is performed, the abundance ratio of the specific stable oxygen isotope in the stable isotope labeled carbon monoxide obtained by the method of this embodiment can be easily controlled to be an arbitrary value, and at the same time, the abundance ratio of the specific stable carbon isotope in the stable isotope labeled carbon monoxide obtained by the method of this embodiment can also be easily controlled to be an arbitrary value.

As a method for controlling the abundance ratio of the stable carbon isotope to be an arbitrary value in operations A1 and A3, a method in which the stable isotope labeled carbon monoxide or the stable isotope labeled carbon dioxide in the producing apparatus 1 is led into a storage container from the lead-out line L5, and the cryogenic separation method or the method combining the cryogenic separation method and the isotope exchange reaction is carried out, is an exemplary example.

Either one of the operations A1 to A3 may be performed independently, and plural operations may be performed in combination. Even when plural operations are performed in combination, an effect by each operation combined can be obtained.

The operation A2 will be described in more detail. When the abundance ratio of the stable oxygen isotope in the water vapor is controlled to be an arbitrary value in advance before mixing the carbon monoxide and the water vapor in the first embodiment, the abundance ratio of the specific stable oxygen isotope in the stable isotope labeled carbon dioxide obtained can be easily controlled to be an arbitrary value. As a result, it is possible to freely control the abundance ratio of the specific stable oxygen isotope in the stable isotope labeled carbon monoxide obtained.

For example, before mixing the carbon monoxide and the water vapor, when the abundance ratio of the specific stable oxygen isotope in the water vapor is controlled to be an arbitrary value in advance, for example, when the water vapor containing 95 atom % of $H_2{}^{18}O$ with respect to the total of 100 atom % of $H_2{}^{16}O$, $H_2{}^{17}O$ and $H_2{}^{18}O$, the abundance ratio of $^{18}O$ in the stable isotope labeled carbon dioxide produced can be controlled to 95 atom % or more. As a result, the abundance ratio of $^{13}C^{18}O$ in the stable isotope labeled carbon monoxide ratio produced can be arbitrarily controlled and increased to 95 atom % or more.

In this way, it is possible to arbitrarily control the abundance ratio of the specific stable oxygen isotope ($^{18}O$ in the present embodiment) in the stable isotope labeled carbon dioxide produced and the stable isotope labeled carbon monoxide produced by arbitrarily changing the abundance ratio of the stable oxygen isotope contained in the specific stable isotope ($H_2{}^{18}O$ in the present embodiment) contained in the water vapor.

(Method for Producing Stable Isotope Labeled Carbon Dioxide)

A method for producing stable isotope labeled carbon dioxide will be explained. In the present embodiment, carbon monoxide selectively containing at least one kind of stable isotope selected from the group consisting of $^{12}C^{16}O$, $^{12}C^{17}O$, $^{12}C^{18}O$, $^{13}C^{16}O$, $^{13}C^{17}O$, and $^{13}C^{18}O$ and water vapor selectively containing at least one kind of stable isotope selected from the group consisting of $H_2{}^{16}O$, $H_2{}^{17}O$, and $H_2{}^{18}O$ are mixed.

Specifically, the carbon monoxide is supplied from the supply source 3 into the catalyst tube C1, the water is supplied from the supply source 4 into the catalyst tube C1 after being vaporized, and the carbon monoxide and the water vapor are mixed in the catalyst tube C1. Moisture is removed from the reaction product produced by the chemical reaction between the carbon monoxide and hydrogen by the dehumidifier F1. Then, stable isotope labeled carbon dioxide (the reaction product) is led into the storage container, which is not shown in figures, through the connection line L3 and the lead-out line L5. Thereby, it is possible to produce the stable isotope labeled carbon dioxide selectively containing the specific kind of stable isotope labeled carbon dioxide.

Preferable conditions and modes for mixing the carbon monoxide and the water vapor are the same as the method for producing stable isotope labeled carbon monoxide of the first embodiment.

(Effects)

In the first embodiment as described above, the carbon monoxide selectively containing at least one kind of stable isotope selected from the group consisting of $^{12}C^{16}O$, $^{12}C^{17}O$, $^{12}C^{18}O$, $^{13}C^{16}O$, $^{13}C^{17}O$, and $^{13}C^{18}O$ and the water vapor selectively containing at least one kind of stable isotope selected from the group consisting of $H_2{}^{16}O$, $H_2{}^{17}O$, and $H_2{}^{18}O$ are mixed to produce the stable isotope labeled carbon dioxide selectively containing the specific stable isotope labeled carbon dioxide. Therefore, it is possible to introduce the specific oxygen atom isotope derived from the water vapor to the carbon monoxide. Therefore, according to the method for producing stable isotope labeled carbon monoxide in the first embodiment, it is possible to arbitrarily control the abundance ratio of the specific oxygen atom isotope without addition of a process for decreasing or increasing the abundance ratio of the specific stable oxygen isotope.

Second Embodiment

Below, a second embodiment will be described with reference to FIG. 1. In the description of the second embodiment, the same components as those described in the first embodiment are denoted by the same reference numerals, and an explanation thereof will be omitted.

In the second embodiment, a case in which carbon monoxide selectively contains $^{13}C^{18}O$ as specific stable isotope and water vapor selectively contains either one or both of $H_2^{16}O$ and $H_2^{17}O$ as specific stable isotope.

First, in the second embodiment, carbon monoxide and water vapor are supplied into the catalyst tube C1 and mixed together. Thereby, at least one of the equilibrium reactions represented by the following formulas (5) to (10) occurs depending on the kind of stable isotope contained in the carbon monoxide.

Formula (5)

Formula (6)

Formula (7)

Formula (8)

Formula (9)

Formula (10)

In the equilibrium state represented by the formula (5), when $H_2^{16}O$ is excessively supplied, the isotope exchange reaction shown in the following formula (11) occurs. When the reaction shown in the following formula (11) occurs, the oxygen atom in $^{13}C^{18}O^{16}O$ is exchanged with $^{16}O$ contained in an excessive amount of water vapor, and $^{13}C^{16}O^{16}O$ is produced.

Formula (11)

In the equilibrium state represented by the formula (6), when $H_2^{17}O$ is excessively supplied, the isotope exchange reaction shown in the following formula (12) occurs. When the reaction shown in the following formula (12) occurs, the oxygen atom in $^{13}C^{17}O^{18}O$ is exchanged with $^{17}O$ contained in an excessive amount of the water vapor, and $^{13}C^{17}O^{17}O$ is produced.

Formula (12)

As shown in the formulas (11) and (12), in the second embodiment, the oxygen atom in $^{13}C^{18}O$ is exchanged with $^{16}O$ or $^{17}O$, and the abundance ratio of $^{18}O$ in the stable isotope labeled carbon dioxide is decreased. The chemical reaction shown in the formula (13) mainly occurs in the catalyst tube C2 by supplying the stable isotope labeled carbon dioxide with a reduced abundance ratio of $^{18}O$ and hydrogen into the catalyst tube C2 and mixing them. When the chemical reaction shown in the formula (13) occurs, the stable isotope labeled carbon monoxide with a reduced abundance ratio of $^{18}O$ is produced.

Formula (13)

In the formula (13), O is either $^{16}O$ or $^{17}O$.

In the method for producing the stable isotope labeled carbon monoxide of the second embodiment, the conditions such as the flow rate and the temperature at the time of carrying out the reaction shown in the formulas (5) to (13) are the same as those of the formulas (2) to (4).

(Effects)

In the second embodiment described above, the carbon monoxide selectively containing $^{13}C^{18}O$ and the water vapor selectively containing either or both of $H_2^{16}O$ and $H_2^{17}O$ are mixed. Therefore, the carbon oxide stable isotope with a reduced abundance ratio of $^{18}O$ is produced. According to the method for producing stable isotope labeled carbon monoxide of the second embodiment, it is possible to reduce the abundance ratio of $^{18}O$ to be an arbitrary value without adding a step of decreasing the amount of $^{18}O$.

According to the second embodiment, even when the carbon monoxide ($^{13}C^{18}O$ in the present embodiment), which includes 1 to 20 atom % of stable isotope having $^{18}O$ with respect to the total of 100 atom % of the stable isotope labeled carbon monoxide having $^{16}O$, the stable isotope labeled carbon monoxide having $^{17}O$, and the stable isotope labeled carbon monoxide having $^{18}O$, is used, it is possible to control the abundance ratio of $^{18}O$ in the stable isotope labeled carbon dioxide produced to 8 atom % or less. It is possible to decrease the abundance ratio of $^{13}C^{18}O$ in the stable isotope labeled carbon monoxide produced to less than 8 atom %, that is, dilute $^{13}C^{18}O$ by the method according to the second embodiment.

In this way, according to the second embodiment, at least one kind of stable oxygen isotope ($^{18}O$ in the present embodiment) contained in the stable isotope selectively contained in the carbon monoxide and the stable oxygen isotope ($^{16}O$ or $^{17}O$ in the present embodiment) contained in the stable isotope selectively contained in the water vapor are different from each other. Therefore, the abundance ratio of the specific stable oxygen isotope ($^{18}O$ in the present embodiment) in the stable isotope labeled carbon dioxide, which is produced by mixing the carbon monoxide and the water vapor, can be decreased to be an arbitrary value, that is, the specific stable oxygen isotope ($^{18}O$ in the present embodiment) in the stable isotope labeled carbon dioxide can be diluted. It is possible to decrease the abundance ratio of the specific stable oxygen isotope in the stable isotope labeled carbon monoxide produced by mixing the stable isotope labeled carbon dioxide produced and hydrogen.

The method for producing stable isotope labeled carbon monoxide according to the second embodiment described above is a method for diluting the specific kind of stable isotope by reducing the abundance ratio of specific kind of stable isotope in the carbon monoxide containing a plurality of kinds of stable isotopes. In the second embodiment, the case in which the water vapor selectively contains one or both of $H_2^{16}O$ and $H_2^{17}O$ has been described as an example, but the second embodiment is not limited to this example. For example, in order to reducing the abundance ratio of $^{13}C^{16}O$ in carbon monoxide to be an arbitrary value, that is, to dilute, water vapor which selectively contains either or both $H_2^{17}O$ and $H_2^{18}O$ and carbon monoxide may be mixed.

Third Embodiment

Below, a third embodiment will be described with reference to FIG. 1. In the description of the third embodiment, the same components as those described in the first embodiment are denoted by the same reference numerals, and an explanation thereof will be omitted.

Figure 2:
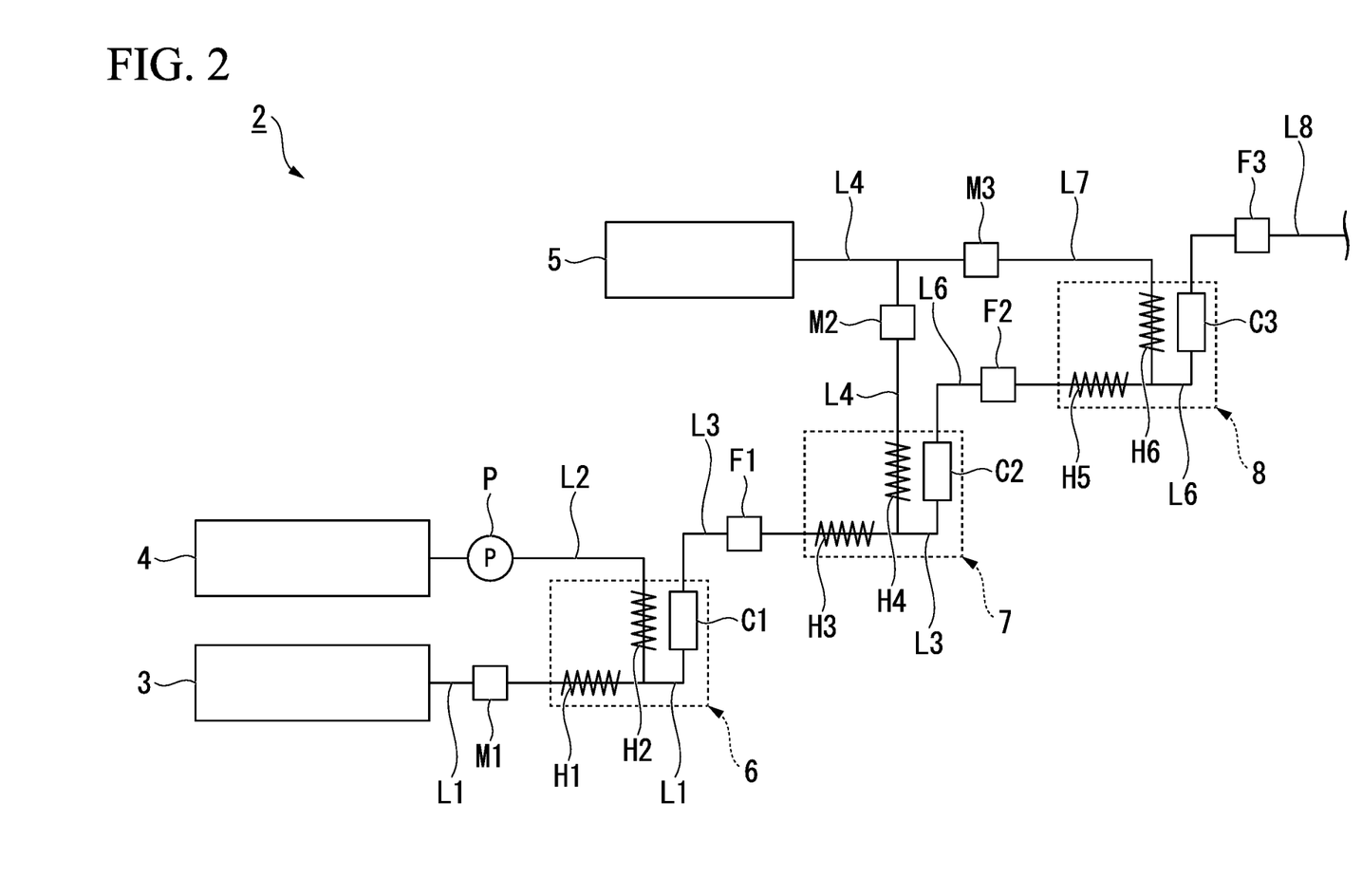
FIG. 2 is a schematic diagram showing an example of a producing apparatus applicable to a method for producing stable isotope labeled carbon monoxide according to a third embodiment.

FIG. 2 is a schematic diagram showing one example of a producing apparatus 2 which can be used in a method for producing stable isotope labeled carbon monoxide of the third embodiment. As shown in FIG. 2, the producing apparatus 2 includes supply sources 3, 4, and 5 and supply lines L1, L2, L4, and L7, catalyst tubes C1, C2, and C3, temperature control devices 6, 7, and 8, connection lines L3 and L6, a lead-out line L8 and dehumidifiers F1, F2, and F3.

The connection line L6 has a first end connected to the secondary side of the catalyst tube C2 and a second end connected to the primary side of the catalyst tube C3. Thereby, the connection line L6 connects between the secondary side of the catalyst tube C2 and the primary side of the catalyst tube C3. The connection line L6 is provided with the dehumidifier F2 and a heat exchanger H5 in this order from the primary side.

The supply line L7 has a first end connected to the supply line L4 between the supply source 5 and the flow regulator M2 and a second end connected to the connection line L6 between the heat exchanger H5 and the catalyst tube C3. The supply line L7 is provided with a flow regulator M3 and a heat exchanger H6 in this order from the primary side.

The supply source 5 is a supply source of hydrogen. In the third embodiment, the supply source 5 supplies hydrogen into the catalyst tube C2 via supply line L4 and a part of the connection line L3. In addition, the supply source 5 also supplies hydrogen into the catalyst tube C3 via a part of the supply line L4, the supply line L7, and a part of the connection line L6.

As the catalyst of the catalyst tube C3, the same catalyst as that of the catalyst tubes C1 and C2 is an exemplary example.

The temperature control device 8 is not particularly limited as long as it can adjust the temperature of the heat exchangers H5 and H6 and the catalyst tube C3.

The lead-out line L8 has a first end connected to the secondary side of the catalyst tube C3, and a second end (not shown) is connected to a storage container (not shown). The lead-out line 8 is provided with the dehumidifier F3. In addition, the lead-out line 8 is provided with an analyzer (not shown) at the secondary side of the dehumidifier F3.

Next, a method for producing stable isotope labeled carbon monoxide according to the third embodiment will be described. In order to simplify the explanation, in the following third embodiment as well as the first embodiment, a case in which carbon monoxide selectively contains only $^{13}C^{16}O$ as specific stable isotope and water vapor selectively contains only $H_2^{18}O$ as specific stable isotope will be described as an embodiment. However, the third embodiment is not limited to this embodiment.

First, carbon monoxide and water vapor are mixed in the method for producing stable isotope labeled carbon monoxide of the third embodiment. Specifically, carbon monoxide is supplied from the supply source 3 into the catalyst tube C1, and water vapor is supplied from the supply source 4 into the catalyst tube C1. Thereby, an equilibrium reaction expressed by the following equation (2) occurs in the catalyst tube C1.

$$^{13}C^{16}O + H_2^{18}O \rightleftharpoons {}^{13}C^{18}O^{16}O + H_2 \quad \text{Formula (2)}$$

In the equilibrium state shown in the formula (2), an isotope exchange reaction shown in the following formula (3) occurs by excessively supplying the water vapor. When the reaction shown in the following formula (3) occurs, the oxygen atom in $^{13}C^{18}O^{16}O$ is exchanged with $^{18}O$ contained in an excessive amount of the water vapor to produce $^{13}C^{18}O^{18}O$.

$$^{13}C^{18}O^{16}O + H_2^{18}O \rightarrow {}^{13}C^{18}O^{18}O + H_2^{16}O \quad \text{Formula (3)}$$

Next, in the method for producing stable isotope labeled carbon monoxide of the third embodiment, the stable isotope labeled carbon dioxide and hydrogen are mixed. $^{13}C^{18}O^{18}O$ which is the reaction product of the formula (3) passes through the connection line L3. After removal of moisture by the dehumidifier F1, the reaction product is heated by the heat exchanger H3, and supplied into the catalyst tube C2 as stable isotope labeled carbon dioxide selectively containing $^{13}C^{18}O^{18}O$. On the other hand, an excessive amount of the hydrogen is supplied from the supply source 5 into the catalyst tube C2 via the supply line L4 and the like. Therefore, in the catalyst tube C2, the chemical reaction shown in the following formula (4) occurs.

$$^{13}C^{18}O^{18}O + H_2 \rightarrow {}^{13}C^{18}O + H_2^{18}O \quad \text{Formula (4)}$$

Next, in the method for producing stable isotope labeled carbon monoxide of the third embodiment, the stable isotope labeled carbon dioxide and hydrogen are mixed once more. Unreacted stable isotope labeled carbon dioxide, which is not reacted with hydrogen, is flowing through the connection line L6. The unreacted stable isotope labeled carbon dioxide passes through the connection line L6 together with the reaction product, $^{13}C^{18}O$, of the chemical reaction shown in formula (4). The moisture is removed by the dehumidifier F2, the unreacted stable isotope labeled carbon dioxide and the reaction product are heated by the heat exchanger H5, and then supplied into the catalyst tube C3. On the other hand, an excessive amount of hydrogen is supplied into the catalyst tube C3 from the supply source 5 through the supply line L7 and the like. Therefore, in catalyst tube C3, the chemical reaction shown in equation (4) occurs one more time.

Thereafter, $^{13}C^{18}O$ which is the reaction product of the chemical reaction shown in the formula (4) passes through the lead-out line L8. After removing moisture by the dehumidifier F3, the reaction product is led into a storage container (not shown).

(Effects)

In the third embodiment above, since the operation of mixing of the stable isotope labeled carbon dioxide and hydrogen is performed a plurality of times, it is possible to reliably react unreacted stable isotope labeled carbon dioxide which has not reacted with hydrogen in the chemical reaction shown in the first formula (4) with hydrogen. Therefore, according to the method for producing of stable isotope labeled carbon monoxide of the third embodiment, in addition to the same effects as those of the first embodiment can be obtained, the yield of the stable isotope labeled carbon monoxide, in which the abundance ratio of specific kind of stable oxygen isotope is controlled to be an arbitrary value, can be higher than that in the first embodiment.

Although several embodiments have been described above, the present invention is not limited to the specific embodiments. In addition, the present invention may be added, omitted, substituted, and other changes in composition within the scope of the present invention described in the claims.

For example, in the first embodiment and third embodiment above, the case in which the carbon monoxide selectively contains only $^{13}C^{16}O$ and the water vapor selectively contains only $H_2^{18}O$ has been described as an example. However, the first embodiment and the third embodiment are not limited to this example. In other words, the carbon monoxide may selectively contain one kind of stable isotope other than $^{13}C^{16}O$, and may contain at least two or more kinds of stable isotopes. Similarly, the water vapor may selectively contain one kind of stable isotope other than $H_2^{18}O$ and may contain at least two or more kinds of stable isotopes.

EXAMPLES

Hereinafter, the present invention will be specifically described with reference to examples, but the present invention is not limited by the following examples. In the following examples, carbon monoxide includes stable isotope ($C^{17}O$) having $^{17}O$. However, the description of $C^{17}O$ may be omitted for the sake of simplicity.

Example 1

A carbon monoxide X1 consisting of $^{12}C^{16}O$, $^{12}C^{17}O$, and $^{12}C^{18}O$ was prepared in advance in Example 1. With respect to the total of 100 atom % of all kinds of stable isotopes contained in carbon monoxide X1, the amount of $^{12}C^{16}O$ was about 99 atom %, the amount of $^{12}C^{18}O$ was about 1 atom %, and the amount of $^{12}C^{17}O$ was the remainder obtained by subtracting the total amount of $^{12}C^{16}O$ and $^{12}C^{18}O$ from the total amount of the carbon monoxide X1.

Next, water vapor Y1 consisting of $H_2^{16}O$, $H_2^{17}O$, and $H_2^{18}O$ was prepared. With respect to the total of 100 atom % of all kinds of stable isotopes contained in the water vapor Y1, the amount of $H_2^{16}O$ was about 2 atom %, the amount of $H_2^{18}O$ was about 98 atom %, and the amount of $H_2^{17}O$ is the remainder obtained by subtracting the total amount of $H_2^{16}O$ and $H_2^{18}O$ from the total amount of the water vapor Y1.

The carbon monoxide X1 and the water vapor Y1 were mixed in the catalyst tube C1 in the production apparatus 1. In Example 1, stable isotope labeled carbon dioxide Z1 was produced without supplying hydrogen from the supply line L4 into the catalyst tube C2, and the stable isotope labeled carbon dioxide Z1 produced was led out through the connection line L3 and lead-out line L5. In Example 1, a Cu/Cr/Fe catalyst was used as a catalyst of the catalyst tube C1 and the temperature of the catalyst tube C1 was set to 250° C. Using an analyzer, the composition of the stable isotope labeled carbon dioxide contained in the stable isotope labeled carbon dioxide Z1 was analyzed. As a result, it was confirmed that the stable isotope labeled carbon dioxide Z1 contained about 2 atom % of $^{12}C^{16}O^{16}O$, about 95 atom % of $^{12}C^{18}O^{18}O$, and about 3 atom % of $^{12}C^{18}O^{16}O$ with respect to the total of 100 atom % of all kinds of stable isotopes contained in stable isotope labeled carbon dioxide Z1.

According to Example 1, the carbon monoxide X1 selectively containing $^{12}C^{16}O$ and the water vapor selectively containing $H_2^{18}O$ were mixed to produce the stable isotope labeled carbon dioxide Z1 selectively containing $^{12}C^{18}O^{18}O$ as the specific stable isotope labeled carbon dioxide. It was confirmed that $^{18}O$ which was the oxygen atom isotope derived from the water vapor could be introduced into the carbon monoxide X1.

Example 2

Next, the stable isotope labeled carbon dioxide Z1 was produced in the same manner as in Example 1, and the stable isotope labeled carbon dioxide Z1 produced and hydrogen were mixed in the catalyst tube C2 to produce stable isotope labeled carbon monoxide E1. Moreover, in Example 2, a Ni/Al based catalyst was used as a catalyst in catalyst tube C2 and the temperature of the catalyst tube C2 was set to 600° C. The composition of the stable isotope labeled carbon monoxide E1 was analyzed using an analyzer. As a result, the stable isotope labeled carbon monoxide E1 mainly contained about 4 atom % of $^{12}C^{16}O$ and about 96 atom % of $^{12}C^{18}O$ with respect to the total of 100 atom % of all kinds of stable isotopes contained in stable isotope labeled carbon monoxide E1.

It was confirmed that according to Example 2, the abundance ratio of $^{16}O$, which was about 99 atom % in the carbon monoxide X1, could be controlled to about 4 atom % in the stable isotope labeled carbon monoxide E1, and the abundance ratio of $^{18}O$, which was about 1 atom % in the carbon monoxide X1, could be controlled to about 96 atom % in the monoxide stable isotope E1.

Example 3

In Example 3, the carbon monoxide X1 and the water vapor Y1 were mixed using the production apparatus 2 to produce the stable isotope labeled carbon dioxide Z1. Moreover, in Example 3, the temperature of the catalyst tube C1 was set to 250° C., and the composition of the carbon monoxide X1, the water vapor Y1 and the stable isotope labeled carbon dioxide Z1 were the same as that in Example 1.

Next, the stable isotope labeled carbon dioxide Z1 produced and hydrogen were mixed in the catalyst tube C2 using the production apparatus 2 to produce a reaction mixture R1 containing the stable isotope labeled carbon dioxide Z1. Moreover, the temperature of the catalyst tube C2 was set to 600° C. The composition of the reaction mixture R1 was analyzed using an analyzer. As a result, it was confirmed that the reaction mixture R1 contained about 2 atom % of $^{12}C^{16}O^{16}O$, about 95 atom % of $^{12}C^{18}O^{18}O$, and about 3 atom % of $^{12}C^{18}O^{16}O$ with respect to the total of 100 atom % of all kinds of stable isotopes contained in the reaction mixture R1.

Further, the reaction mixture R1 and hydrogen were mixed in the catalyst tube C3 using the production apparatus 2 to produce stable isotope labeled carbon monoxide E2. In Example 3, a Ni/Al kind catalyst was used as a catalyst of the catalyst tube C3 and the temperature of the catalyst tube C3 was set to 600° C. The composition of stable isotope labeled carbon monoxide E2 was analyzed by using an analyzer. As a result, it was confirmed that the stable isotope labeled carbon monoxide E2 contained 4 atom % of $^{12}C^{16}O$ and about 96 atom % of $^{12}C^{18}O$ with respect to the total of 100 atom % of all kinds of stable isotopes contained in stable isotope labeled carbon monoxide E2.

According to Example 3, the abundance ratio of $^{16}O$, which was about 99 atom % in the carbon monoxide X1, could be controlled to about 4 atom % in the stable isotope labeled carbon monoxide E2 produced, and the abundance ratio of $^{18}O$, which was about 1 atom % in carbon monoxide X1, could be controlled to about 96 atom % in the stable isotope labeled carbon monoxide E2 produced. The yield of the stable isotope labeled carbon monoxide E2 produced in Example 3 was higher than that of the stable isotope labeled carbon monoxide E1 produced in Example 2.

INDUSTRIAL APPLICABILITY

The method for producing stable isotope labeled carbon monoxide and a method for producing stable isotope labeled carbon dioxide of the present invention can be applied to the industrial production of stable isotope-labeled gas.

REFERENCE SIGNS LIST 1, 2 producing apparatus
3 to 5 supply source
6 to 8 temperature control device
L1, L2, L4, and L7 supply line
L3 and L6 connection line
L5 and L8 lead-out line
C1 to C3 catalyst tube
F1 to F3 dehumidifier
H1 to H6 heat exchanger
M1 to M3 flow regulator

What is claimed is:

1. A method for producing stable isotope labeled carbon monoxide comprising:
a first mixing step in which carbon monoxide selectively containing at least one kind of stable isotope selected from the group consisting of $^{12}C^{16}O$, $^{12}C^{17}O$, $^{12}C^{18}O$, $^{13}C^{16}O$, $^{13}C^{17}O$, and $^{13}C^{18}O$, and water vapor selectively containing at least one kind of stable isotope selected from the group consisting of $H_2^{16}O$, $H_2^{17}O$ and $H_2^{18}O$ are mixed to produce stable isotope labeled carbon dioxide; and
a second mixing step in which the stable isotope labeled carbon dioxide produced in the first mixing step and hydrogen are mixed,
wherein step said carbon monoxide contains at least $^{13}C^{18}O$ and said water vapor contains at least one of $H_2^{16}O$ and $H_2^{17}O$ so that carbon monoxide containing $^{13}C^{18}O$ and water vapor containing either or both of $H_2^{16}O$ and $H_2^{17}O$ are mixed.

2. The method for producing stable isotope labeled carbon monoxide according to claim 1, wherein, in the first mixing step, a volume ratio (V1/V2) between a flow rate V1 of the water vapor and a flow rate V2 of the carbon monoxide is set to 1 to 100.

3. The method for producing stable isotope labeled carbon monoxide according to claim 1, wherein, in the second mixing step, a volume ratio (V3/V4) between a flow rate V3 of the hydrogen and a flow rate V4 of the stable isotope labeled carbon dioxide is set to 1 to 20.

4. The method for producing stable isotope labeled carbon monoxide according to claim 1, wherein, before the first mixing step, an abundance ratio of stable carbon isotope in the carbon monoxide is controlled to be an arbitrary value in advance.

5. The method for producing stable isotope labeled carbon monoxide according to claim 1, wherein, before the first mixing step, an abundance ratio of stable oxygen isotope in the water vapor is controlled to be an arbitrary value in advance.

6. The method for producing stable isotope labeled carbon monoxide according to claim 1, wherein, after the second mixing step, an abundance ratio of stable carbon isotope is controlled to be an arbitrary value.

7. The method for producing stable isotope labeled carbon monoxide according to claim 1, wherein the second mixing step is performed a plurality of times.

8. The method for producing stable isotope labeled carbon monoxide according to claim 1, wherein the at least one kind of stable oxygen isotope in the stable isotope selectively contained in the carbon monoxide and a kind of stable oxygen isotope in the stable isotope selectively contained in the water vapor are different from each other.

9. A method for producing stable isotope labeled carbon monoxide comprising:
a first mixing step in which carbon monoxide selectively containing at least one kind of stable isotope selected from the group consisting of $^{12}C^{16}O$, $^{12}C^{17}O$, $^{12}C^{18}O$, $^{13}C^{16}O$, $^{13}C^{17}O$, and $^{13}C^{18}O$, and water vapor selectively containing at least one kind of stable isotope selected form the group consisting of $H_2^{16}O$, $H_2^{17}O$ and $H_2^{18}O$ are mixed to produce stable isotope labeled carbon dioxide: and
a second mixing step in which the stable isotope labeled carbon dioxide produced in the first mixing step and hydrogen are mixed,
wherein the carbon monoxide includes 1 to 20 atom % of stable isotope having $^{18}O$ with respect to the total of 100 atom % of stable isotope labeled carbon monoxide having $^{16}O$, stable isotope labeled carbon monoxide having $^{17}O$, and stable isotope labeled carbon monoxide having $^{18}O$.

10. The method for producing stable isotope labeled carbon monoxide according to claim 9, wherein, in the first mixing step, a volume ratio (V1/V2) between a flow rate V1 of the water vapor and a flow rate V2 of the carbon monoxide is set to 1 to 100.

11. The method for producing stable isotope labeled carbon monoxide according to claim 9, wherein, in the second mixing step, a volume ratio (V3/V4) between a flow rate V3 of the hydrogen and a flow rate V4 of the stable isotope labeled carbon dioxide is set to 1 to 20.

12. The method for producing stable isotope labeled carbon monoxide according to claim 6, wherein, before the first mixing step, an abundance ratio of stable carbon isotope in the carbon monoxide is controlled to be an arbitrary value in advance.

13. The method for producing stable isotope labeled carbon monoxide according to claim 9, wherein, before the first mixing step, an abundance ratio of stable oxygen isotope in the water vapor is controlled to be an arbitrary value in advance.

14. The method for producing stable isotope labeled carbon monoxide according to claim 9, wherein, after the second mixing step, an abundance ratio of stable carbon isotope is controlled to be an arbitrary value.

15. The method for producing stable isotope labeled carbon monoxide according to claim 9, wherein the second mixing step is performed a plurality of times.

16. The method for producing stable isotope labeled carbon monoxide according to claim 9, wherein the water vapor contains 95 atom % or more of $H_2^{18}O$ with respect to a total of 100 atom % of $H_2^{16}O$, $H_2^{17}O$, and $H_2^{18}O$.

17. The method for producing stable isotope labeled carbon monoxide according to claim 9, wherein the at least one kind of stable oxygen isotope in the stable isotope selectively contained in the carbon monoxide and a kind of stable oxygen isotope in the stable isotope selectively contained in the water vapor are different from each other.

18. The method for producing stable isotope labeled carbon monoxide according to claim 9, wherein the water vapor selectively contains one or both of $H_2^{16}O$ and $H_2^{17}O$.

* * * * *

UNITED STATES PATENT AND TRADEMARK OFFICE
CERTIFICATE OF CORRECTION

PATENT NO.       : 11,358,873 B2
APPLICATION NO.  : 16/261790
DATED            : June 14, 2022
INVENTOR(S)      : Kenji Fukuda It is certified that error appears in the above-identified patent and that said Letters Patent is hereby corrected as shown below:

In the Claims

Claim 1, Column 17, Line 27, "wherein step said carbon monoxide contains at least" should read -- wherein said carbon monoxide contains at least --; and Claim 12, Column 18, Line 33, "carbon monoxide according to claim 6, wherein, before the..." should read -- carbon monoxide according to claim 9, wherein, before the --.

Signed and Sealed this
Twenty-eighth Day of March, 2023

Katherine Kelly Vidal
*Director of the United States Patent and Trademark Office*